US012776218B2

(12) United States Patent
Liu et al.

(10) Patent No.: US 12,776,218 B2
(45) Date of Patent: Oct. 27, 2026

(54) SYSTEM AND METHOD FOR CLOUD-BASED SCALABLE POSITIONING SYSTEMS

(71) Applicant: GM Global Technology Operations LLC, Detroit, MI (US)

(72) Inventors: Xueshen Liu, Ann Arbor, MI (US); Bo Yu, Troy, MI (US); Fan Bai, Ann Arbor, MI (US); Brent Navin Roger Bacchus, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/951,280

(22) Filed: Nov. 18, 2024

(65) Prior Publication Data

US 2026/0141810 A1 May 21, 2026

(51) Int. Cl.
*G08G 1/00* (2006.01)
*G07C 5/00* (2006.01)

(52) U.S. Cl.
CPC ............... *G08G 1/20* (2013.01); *G07C 5/008* (2013.01)

(58) Field of Classification Search
CPC ................................. G08G 1/20; G07C 5/008
See application file for complete search history.

(56) References Cited

U.S. PATENT DOCUMENTS

2021/0327097 A1* 10/2021 Ramasubramonian ...................... H04N 19/90
2022/0126864 A1* 4/2022 Moustafa .......... B60W 60/0013
2022/0169287 A1* 6/2022 Beaurepaire ....... G01C 21/3492
2022/0319336 A1* 10/2022 Averbuch ............. G08G 1/0141
2022/0414394 A1* 12/2022 Wang ................... G06V 10/757
2023/0112004 A1 4/2023 Hari et al.
2023/0204372 A1* 6/2023 Xu ....................... G08G 1/0112

FOREIGN PATENT DOCUMENTS

DE 102016214601 A1 2/2018
DE 102022001720 B3 8/2023

* cited by examiner

*Primary Examiner* — Tan Q Nguyen
(74) *Attorney, Agent, or Firm* — Honigman LLP; Matthew H. Szalach

(57) ABSTRACT

A system and method includes identifying a plurality of vehicles as a first cluster of vehicles, the first cluster of vehicles having a front-end and a back-end, each of the front-end of the first cluster of vehicles and the back-end of the first cluster of vehicles executing a respective latency masking model, receiving, from each vehicle of the first cluster of vehicles, respective sensor data collected from a sensor system of the vehicle, and categorizing the sensor data as one of in-order and out-of-order. The system and method also include processing the in-order sensor data using the front-end executing the respective latency masking mode and the out-of-order sensor data using the back-end executing the respective latency masking model, and generating a location estimation of each vehicle in the first cluster of vehicles.

20 Claims, 8 Drawing Sheets

SYSTEM AND METHOD FOR CLOUD-BASED SCALABLE POSITIONING SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to cloud-based scalable positioning systems for vehicles. Vehicle positioning systems are integral to modern transportation, enabling the tracking and management of multiple vehicles in real-time. These systems typically utilize a combination of Global Positioning Systems (GPS), cellular networks, and other sensor data to determine the precise location of each vehicle. This information is then transmitted to a central server, where it can be used for various applications such as fleet management, navigation, and traffic monitoring. In fleet management, for example, operators can monitor the location and status of all vehicles, optimizing routes and improving efficiency. Similarly, navigation systems use real-time positioning data to provide accurate directions and traffic updates to drivers. These systems are crucial for ensuring the safety and efficiency of transportation networks.

However, the algorithms used in autonomous driving systems to process positioning data are highly computing-intensive. These algorithms must continuously analyze vast amounts of data from multiple sensors to make real-time driving decisions. This computational demand can lead to delays in processing data packets, especially when the data is transmitted over networks with varying latency. Additionally, data packets from individual vehicles may arrive out of order, further complicating the processing and integration of this information. These challenges highlight the need for more efficient and scalable solutions to handle the growing demands of autonomous vehicle positioning systems.

SUMMARY

One aspect of the disclosure provides a computer-implemented method for cloud-based scalable positioning systems that when executed on data processing hardware causes the data processing hardware to perform operations that include identifying a plurality of vehicles as a first cluster of vehicles, the first cluster of vehicles having a front-end and a back-end. Here, each of the front-end of the first cluster of vehicles and the back-end of the first cluster of vehicles executes a respective latency masking model. The operations also include receiving, from each vehicle of the first cluster of vehicles, respective sensor data collected by a sensor system of the vehicle, and categorizing the sensor data as one of in-order and out-of-order. The operations also include processing the in-order sensor data using the front-end of the first cluster of vehicles executing the respective latency masking model, processing the out-of-order sensor data using the back-end of the first cluster of vehicles executing the respective latency masking model, and generating a location estimation for each vehicle in the first cluster of vehicles.

Implementations of the disclosure may include one or more of the following optional features. In some implementations, categorizing the sensor data as one of in-order and out-of-order includes adding the out-of-order sensor data to a batch of out-of-order sensor data. In these implementations, processing the out-of-order sensor data may include processing the batch of out-of-order sensor data at a predetermined time threshold.

In some examples, each of the latency masking models is configured to receive, as input, the sensor data and generate, as output, the location estimation of each vehicle of the first cluster of vehicles. In these examples, each of the latency masking models may execute a respective position prediction model. Here, the sensor data for each vehicle of the first cluster of vehicles may include one or more of original sensor data detected by a sensor system of the respective vehicle, proximate sensor data detected by other vehicles in the first cluster of vehicles, and base sensor data detected by a base station in communication with the first cluster of vehicles.

In some implementations, the operations further include receiving a position prediction of each vehicle of the first cluster of vehicles. In these implementations, the operations may further include identifying one or more of the sensor data as missing based on corresponding temporal data of the sensor data, and inserting the received position prediction of the vehicle into a factor graph of the first cluster of vehicles based on the corresponding temporal data of the identified missing sensor data. In some examples, the operations further include identifying that a first vehicle of the first cluster of vehicles has joined a second cluster of vehicles and extracting the sensor data associated with the first vehicle from the front end of the first cluster of vehicles. In these examples, the operations may further include reconstructing, using the extracted sensor data associated with the first vehicle from the front end of the first cluster of vehicles, a factor graph of the second cluster of vehicles to include the first vehicle.

Another aspect of the disclosure provides a system for cloud-based scalable positioning that includes data processing hardware and memory hardware in communication with the data processing hardware. The memory hardware stores instructions that when executed by the data processing hardware cause the data processing hardware to perform operations that include identifying a plurality of vehicles as a first cluster of vehicles, the first cluster of vehicles having a front-end and a back-end. Here, each of the front-end of the first cluster of vehicles and the back-end of the first cluster of vehicles executes a respective latency masking model. The operations also include receiving, from each vehicle of the first cluster of vehicles, respective sensor data collected by a sensor system of the vehicle, and categorizing the sensor data as one of in-order and out-of-order. The operations also include processing the in-order sensor data using the front-end of the first cluster of vehicles executing the respective latency masking model, processing the out-of-order sensor data using the back-end of the first cluster of vehicles executing the respective latency masking model, and generating a location estimation for each vehicle in the first cluster of vehicles.

This aspect may include one or more of the following optional features. In some implementations, categorizing the sensor data as one of in-order and out-of-order includes adding the out-of-order sensor data to a batch of out-of-order sensor data. In these implementations, processing the out-of-order sensor data may include processing the batch of out-of-order sensor data at a predetermined time threshold.

In some examples, each of the latency masking models is configured to receive, as input, the sensor data and generate, as output, the location estimation of each vehicle of the first cluster of vehicles. In these examples, each of the latency masking models may execute a respective position prediction model. In some implementations, the operations further include identifying that a first vehicle of the first cluster of vehicles has joined a second cluster of vehicles and extracting the sensor data associated with the first vehicle from the front end of the first cluster of vehicles. In these implementations, the operations may further include reconstructing, using the extracted sensor data associated with the first vehicle from the front end of the first cluster of vehicles, a factor graph of the second cluster of vehicles to include the first vehicle.

Another aspect of the disclosure provides a method for latency masking that when executed on data processing hardware causes the data processing hardware to perform operations that include receiving sensor data for a vehicle, the sensor data including spatial data and temporal data, and receiving a position prediction of the vehicle. The operations also include generating a factor graph for a vehicle position of the vehicle, and performing factor graph optimization by associating the spatial data and the temporal data of the sensor data to predict the vehicle position of the vehicle This aspect may include one or more of the following optional features. In some implementations, the sensor data for the vehicle includes one or more of original sensor data detected by a sensor system of the respective vehicle, proximate sensor data detected by other vehicles in the first cluster of vehicles, and base sensor data detected by a base station in communication with the first cluster of vehicles. In these implementations, generating the factor graph for the vehicle position of the vehicle may include identifying one or more of the sensor data as missing based on the corresponding temporal data of the sensor data, and inserting the received position prediction of the vehicle into the factor graph based on the corresponding temporal data of the missing sensor data.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
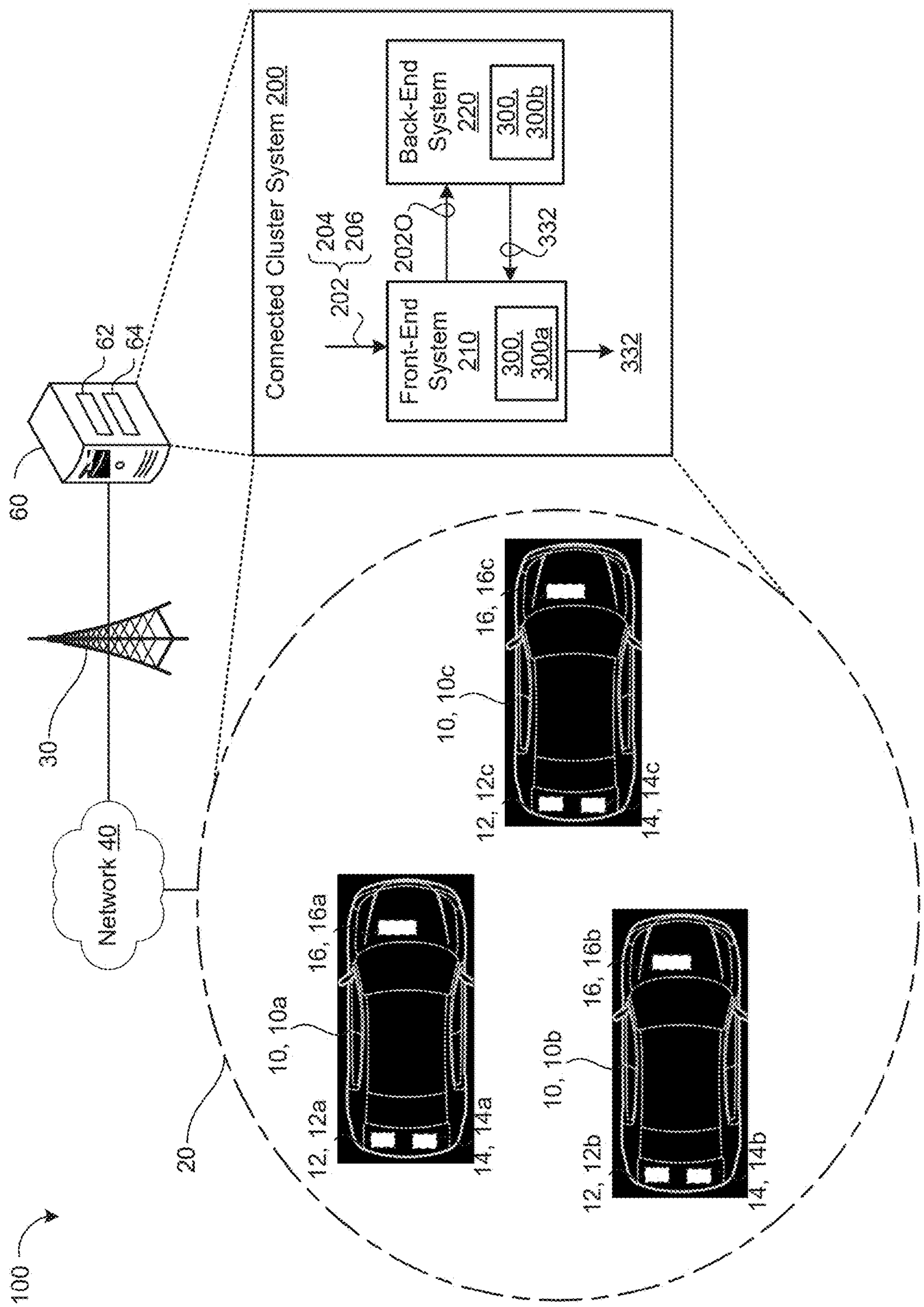
FIG. 1 is a schematic view of an example system for cloud-based scalable positioning.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, in some implementations, a system 100 includes a plurality of vehicles 10, 10*a-c* that form a cluster 20 and are in communication with one another and a base station 30 via a network 40. Additionally, the system 100 includes a remote system 60 in communication with the cluster 20 of vehicles 10 and/or the base station 30 via the network 40. The network 40 may include a wireless local area network (WLAN) that facilitates communication and interoperability among the vehicles 10, the base station 30, and the remote system 60 within an environment of the vehicles 10. Thus, the network 40 can include Wireless Fidelity (WiFi) (e.g., IEEE 802.11), Low-Rate Wireless Personal Area Networks (e.g., IEEE 802.15.4), worldwide interoperability for microwave access (WiMAX), 3G, 4G, Long Term Evolution (LTE), 5G, digital subscriber line (DSL), Bluetooth, Near Field Communication (NFC), or any other wireless standards, or Ethernet (e.g., IEEE 802.3). The vehicles 10 and/or the base station 30 may additionally include one or more access points (AP) (not shown) configured to facilitate wireless communication between the vehicles 10, the base station 30, and/or the remote system 60.

As shown, the vehicles 10 in the cluster 20 and/or the remote system 60 execute a connected cluster system 200 (FIG. 2) configured to associate spatial and temporal data, define a graph-based optimization problem, and calculate a position of each vehicle 10 in the cluster 20 while mitigating the impact of network latency and unsynchronized data. Briefly, and as described in further detail below, traditional positioning systems generally estimate a vehicle position by solving computational graphs (e.g., factor graph, pose graph, etc.) using sensor measurements of an individual vehicle 10. In these positioning systems, the computational graphs are used to identify the position of the individual vehicle 10 using the individual sensor data collected by the vehicle 10. Additionally, these positioning systems may receive out of order sensor data that requires continuous updates to the factor graph that may delay the position estimates.

In contrast, the connected cluster system 200 executed by the cluster 20 of vehicles 10 is configured to receive sensor data 202 from the plurality of vehicles 10, identify which of the plurality of vehicles 10 is in proximity to one another, and cluster the vehicles 10 together to take advantage of vehicle-to-vehicle (V2V) measurements that accurately map the one or more vehicles 10 with respect to one another. Here, due to the inherent mobility of vehicles 10, the connected cluster system 200 dynamically identifies clusters 20 of the vehicles 10 in proximity to one another at any given point in time to improve the flexibility and scalability of the connected cluster system 200 while limiting the computational complexity of increasingly interconnected vehicles 10. For instance, the connected cluster system 200 generates location estimations 332 of each vehicle 10 in the cluster 20 to be used in downstream applications of the vehicle 10 as well as by the other vehicles 10 in the cluster 20. Advantageously, the connected cluster system 200 leverages batch and parallel processing by executing a front-end system 210 that provides fast response times for time-sensitive data 202 for the location estimation 332, and a separate back-end system 220 that performs periodic background processing of out-of-order and/or delayed sensor data 202 for ensuring the accuracy of the location estimation 332. Here, the front-end system 210 may generate/provide an initial factor graph for the cluster 20 of vehicles and update the initial factor graph with a background factor graph generated by the back-end system 220 after it performs its periodic background processing. As described in further detail below, each of the front-end system 210 and the back-end system 220 are configured to perform graph recalculation of a respective factor graph. In this graph recalculation process, each respective masking model 300*a*, 300*b* may update the beliefs (i.e., probabilities or estimates) associated with each variable (i.e., location estimate 322) in the factor graph. This graph recalculation/update is performed after changes to the factor nodes or variable nodes of the factor graph, or when new sensor data 202 becomes available.

In the example shown, the connected cluster system 200 is implemented within the vehicles 10*a*-10*c*. However, the connected cluster system 200 may be implemented in any other propulsion system, such as, without limitation, motorcycles, trucks, off-road vehicles, farm equipment, trains, aircraft, and the like. Each vehicle 10*a*-10*c* includes respective data processing hardware 12*a*-12*c* and memory hardware 14*a*-14*c* storing instructions that when executed on the data processing hardware 12 cause the data processing hardware 12 to perform operations. Each vehicle 10*a*-10*c* further includes one or more respective sensors 16*a*-16*c* configured to capture/receive sensor data 202. The one or more sensors 16 may include one or more of long-range radar sensors, camera sensors capable of capturing image data, global positioning systems (GPS), speedometers, odometers, accelerometers, wireless ranging, inertial measurement units (IMU), etc. The sensor data 202 may include the dynamics of the vehicle 10 such as the speed, yaw, and acceleration, as well as wireless measurements such as Time-of-Flight (TOF), Angle-of-Arrival (AoA), etc. and may be transmitted to the connected cluster system 200 in 10 Hertz (Hz) via the network 40 (i.e., 5G wireless transmissions).

The remote system 60 (e.g., server, cloud computing environment) also includes data processing hardware 62 and memory hardware 64 storing instructions that when executed on the data processing hardware 62 cause the data processing hardware 62 to perform operations. In some examples, execution of the connected cluster system 200 is shared across the cluster 20 of the vehicles 10 and the remote system 60. In other examples, the remote system 60 executes the connected cluster system 200, where the remote system 60 operates as a central host/controller. In additional examples, the connected cluster system 200 is executed on one or more of the vehicles 10 in the cluster 20 (i.e., is shared across the plurality of vehicles 10).

As shown in FIG. 1, the connected cluster system 200 receives, as input, respective sensor data 202 for each of the vehicles 10*a*-10*c*. The sensor data 202 may include spatial data 204 and corresponding temporal data 206 (e.g., timestamps). Based on the relative proximity of the vehicles 10*a*-10*c*, the connected cluster system 200 may cluster the vehicles 10*a*-10*c* into a first cluster 20. Here, the connected cluster system 200 may leverage multiple types of sensor data 202 for each vehicle 10 within the cluster 20. For example, the respective sensor data 202 for each vehicle 10 may include one or more of original sensor data 202 detected by the sensor system 16 of the respective vehicle 10, the proximate sensor data 202 detected by the respective sensor systems 16 of the other vehicles 10 in the cluster 20 of vehicle 10, and base sensor data 202 detected by the base station 30 in communication with the vehicle 10.

After receiving the sensor data 202, a front-end system 210 of the connected cluster system 200 filters the sensor data 202 by categorizing the sensor data 202 as one of in-order sensor data 202I and out-of-order sensor data 202O. Here the front-end system 210 may immediately process the in-order sensor data 202I to using a respective latency masking model 300*a* (FIG. 3) to generate a fast response location estimation 332 for each vehicle 10 in the cluster 20 of vehicles 10*a*-10*c*. In parallel, the back-end system 220 receives the out-of-order sensor data 202O and packs the out-of-order sensor data 202O into batches 242 to avoid redundant updates to the location estimation 332 for each vehicle 10 in the cluster 20. After each predetermined time threshold (e.g., every ten (10) time cycles) passes, the back-end system 220 processes the batch 242 of out-of-order sensor data 202O using a respective latency masking model 300*b* (FIG. 3) to generate a high throughput location estimation 332 for each vehicle 10 in the cluster 20 of vehicles 10*a*-10*c*. In some implementations, the connected cluster system 200 may replace the fast response location estimation 332 generated by the front-end system 210 with the location estimation 332 generated by the back-end system 220.

Figure 2:
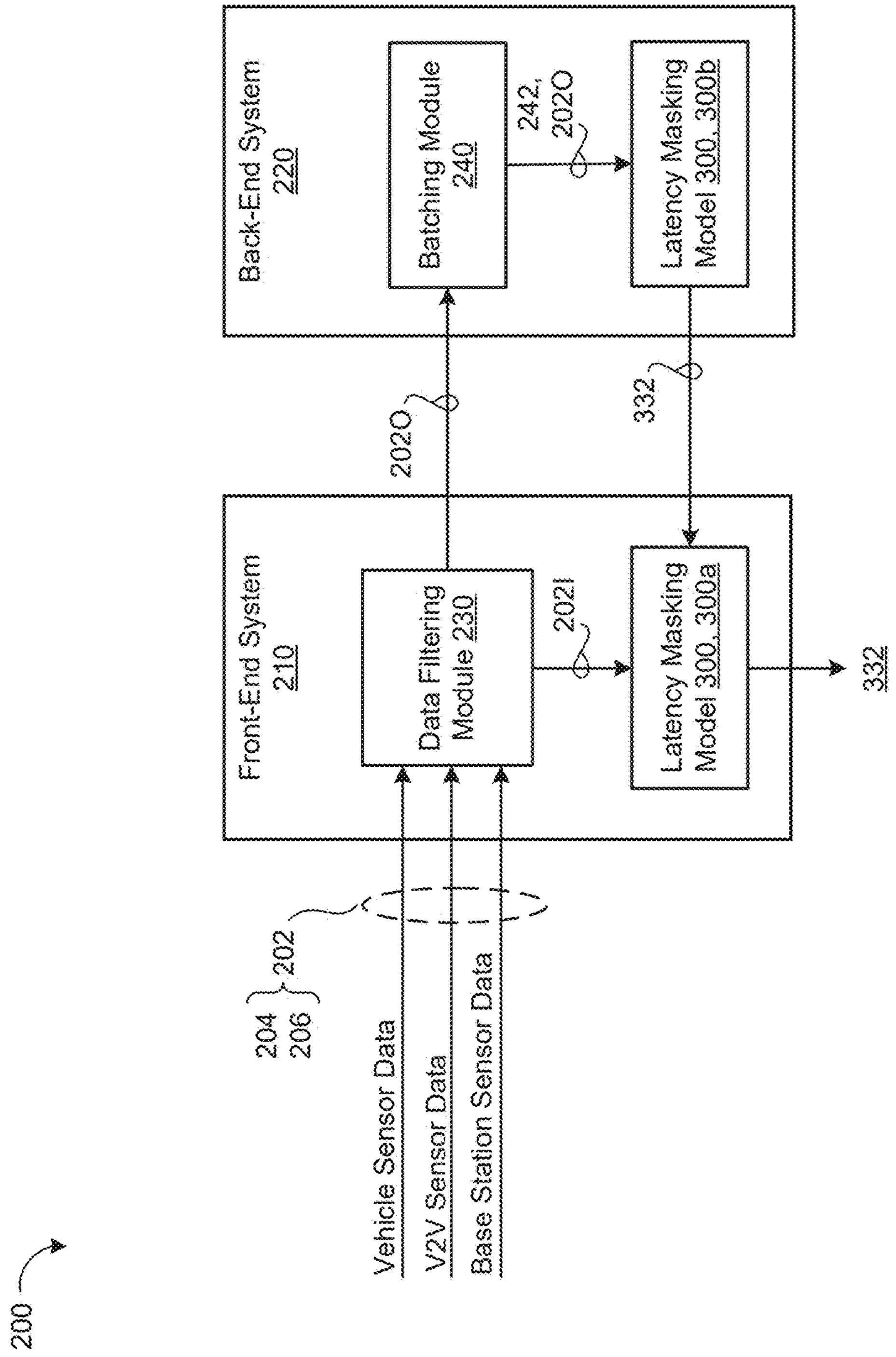
FIG. 2 is a schematic view of example components of FIG. 1.
Figure 3:
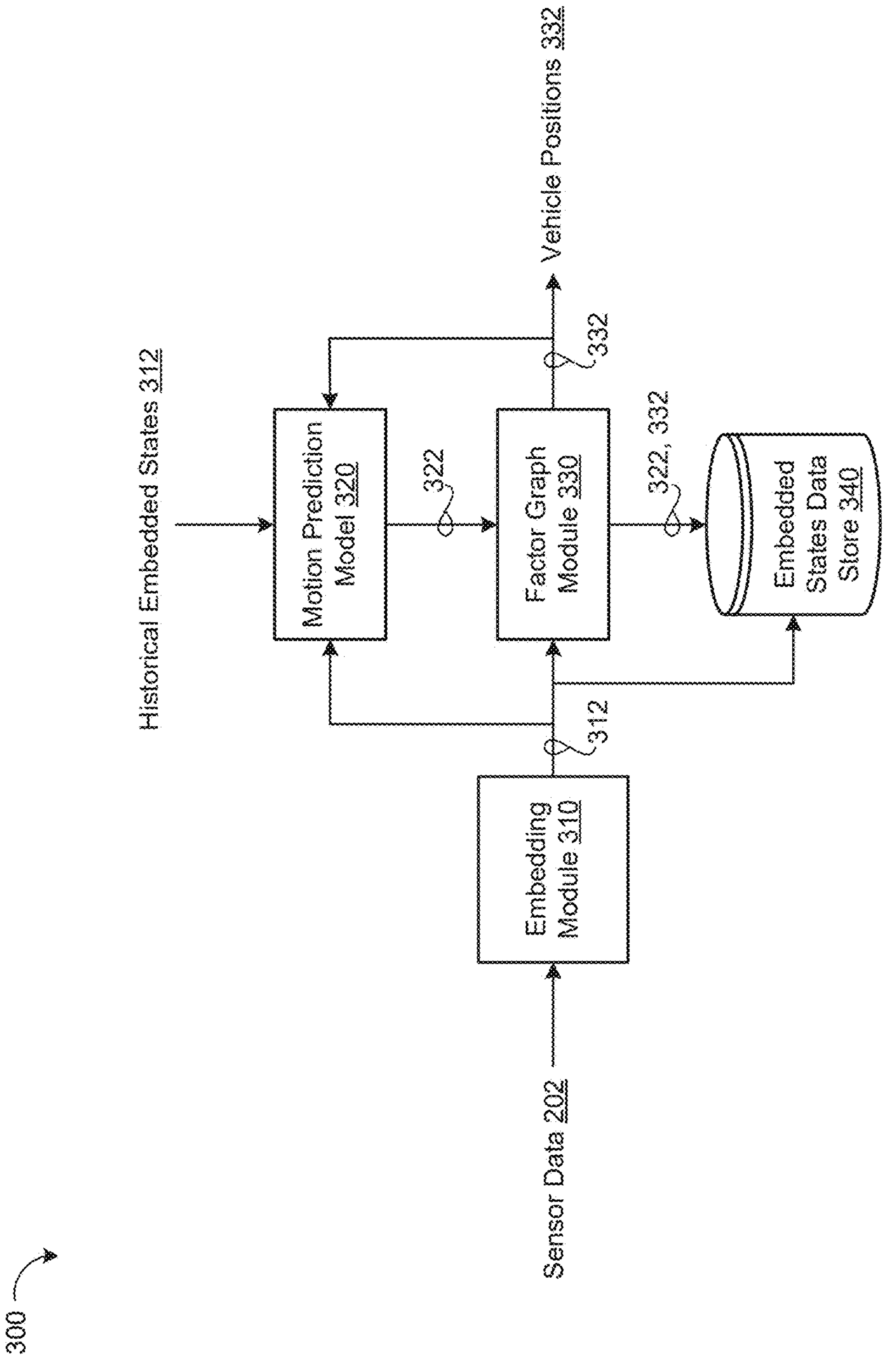
FIG. 3 is a schematic view of example components of FIG. 1.

With reference to FIGS. 2 and 3, the front-end system 210 may include a data filtering module 230 and the latency masking model 300*a*, while the back-end system 220 includes a batching module 240 and the latency masking model 300*b*. The data filtering module 230 is configured to receive the sensor data 202 for each vehicle 10 in the cluster 20 and categorize the sensor data 202 as one of in-order sensor data 202I and out-of-order sensor data 202O. For instance, the data filtering module 230 may categorize the sensor data 202 based on its corresponding temporal data 206 indicating the timestamp of the corresponding sensor data 202. In these instances, the temporal data 206 may indicate whether the corresponding sensor data 202 is still in-sync with the current sensor data 202 being processed by the connected cluster system 200 and/or a common notion of time of the connected cluster system 200. In some implementations, the data filtering module 230 may identify high priority sensor data 202 (e.g., safety critical sensor data 202) as in-order sensor data 202I to ensure that the higher priority sensor data 202 is processed by the latency masking model 300*a* executing by the front-end system 210. Conversely, the data filtering module 230 may categorize time-consuming sensor data 202 as out-of-order sensor data 202O and output the out-of-order sensor data 202O to the back-end system 220 executing the latency masking model 300*b* using batch processing in the background to maintain the fast response time of the latency masking model 300*a* of the front-end system 210. In some instances, the data filtering module 230 identifies sensor data 202 as out-of-order sensor data 202O when an upload time for the sensor data 202 into the connected cluster system 200 exceeds a threshold (e.g., 0.2 seconds).

The sensor data 202 identified as out-of-order sensor data 202O may thereafter be received as input to the batching module 240, which may maintain/hold incoming out-of-order sensor data 202O in batches 242 for processing by the latency masking model 300*b*. Here, the batching module 240 is configured to receive the out-of-order sensor data 202O from the data filtering module 230 and add the out-of-order sensor data 202O to a batch 242 of out-of-order sensor data 202O and only trigger/initiate the execution of the latency masking model 300*b* to process the batch 242 of out-of-order sensor data 202O at a predetermined time threshold. For instance, the latency masking model 300*b* may only process batches 242 of out-of-order sensor data 202O every N seconds, where N may include any number of seconds such as, without limitation, two (2), five (5), ten (10), etc.

Referring to FIG. 3, the latency masking model 300 is shown. As should be appreciated, while the connected cluster system 200 executes the latency masking models 300*a*, 300*b* on front-end system 210 and the back-end system 220 respectively, the underlying architecture of each of the latency masking models 300*a*, 300*b* is the same. Accordingly, the latency masking model 300 of FIG. 3 describes both the latency masking model 300*a* executed by the front-end system 210 and the latency masking model 300*b* executed by the back-end system 220 alike.

As shown, the latency masking model 300 includes an embedding module 310, a motion prediction model 320, and a factor graph module 330. Additionally, the latency masking model 300 has access to an embedded states data store 340 that resides on the respective memory hardware 14 of one or more of the vehicles 10 and/or the memory hardware 64 of the remote system 60. The embedding module 310 is configured to receive, as input, the sensor data 202 (e.g., the in-order sensor data 202I and/or the out-of-order sensor data 202O) and generate, as output, an embedded state 312 of the corresponding sensor data 202. For instance, the generated embedded state 312 output at each time-step may be stored in the embedded states data store 340. Here, the sensor data 202 includes the spatial data 204 and the corresponding temporal data 206. Notably, because the latency masking model 300 may receive incomplete sensor data 202 (i.e., one or more of the received sensor data 202 is missing and/or delayed), the latency masking model 300 is configured to leverage the historical embedded states 312 stored in the embedded states data store 340 to predict a location of the vehicle 10 based on the historical embedded states 312 for any given time that may be used to generate a factor graph when an embedded state 312 for one or more of the sensor data 202 is missing/unaccounted for.

In particular, the motion prediction model 320 of the latency masking model 300 is configured to receive, as input, the previous embedded states 312 of the vehicle 10, and/or the previous embedded states 312 of the other vehicles 10 in the cluster 20, and generate, as output, a position prediction 322 of the vehicle 10. Here, the motion prediction model 320 uses the historical embedded states 312 of the vehicles 10 in the cluster 20 to infer the best location estimate of a vehicle 10. Thereafter, the factor graph module 330 receives, as input, the position prediction 322 of the vehicle 10 and the embedded states 312 of the vehicle 10 and generates a factor graph for a location estimation 332 of the vehicles 10 in the cluster 20. Here, the factor graph module 330 generates the factor graph using the position prediction 322 and the embedded states 312 of the vehicle 10 and/or the other vehicles 10 in the cluster 20. In some instances, the factor graph module 330 concatenates the embedded state 312 with the position prediction 322 when generating each node of the factor graph.

In some instances, the factor graph module 330 identifies that one or more of the sensor data 202 is missing based on its corresponding temporal data 206. In these instances, where a vehicle 10 has missing and/or delayed sensor data 202, the factor graph module 330 may insert the position prediction 322 corresponding to the temporal data 206 of the missing and/or delayed sensor data 202 to fill the factor graph, and may further minimize any error in the factor graph using any embedded states 312 of sensor data 202 of the vehicle 10 collected by the other vehicles 10 in the cluster 20. When the missing and/or delayed sensor data 202 arrives, the factor graph module 330 may update the historical factor graph of the embedded states 312 so that the next position calculation is most accurate.

When the factor graph is generated using the embedded states 312 and the position prediction 322, the factor graph module 330 performs factor graph optimization by associating the spatial data 204 and the temporal data 206 of the sensor data 202 to predict the location estimation 332 of each of the vehicles 10 in the cluster 20. Thereafter, the location estimation 332 and the factor graph may be stored in the embedded states data store 340 for future predictions by the motion prediction model 320 and/or updates by delayed sensor data 202.

Referring again to FIG. 2, the latency masking model 300*a* of the front-end system 210 receives, as input, the in-order sensor data 202I classified by the data filtering module 230, and generates, as output, the location estimation 332 for each of the vehicles 10 in the cluster 20. In parallel, every time threshold period, the batching module 240 of the back-end system 220 feeds the batch 242 of out-of-order sensor data 202O to the latency masking model 300*b*. The latency masking model 300*b* then generates, as output, its own location estimation 332 of each vehicle 10 of the plurality of vehicles 10 in the cluster 20. The front-end system 210 may receive the location estimation 332 generated by the latency masking model 300*b* of the back-end system 220 and may update/recalculate the current factor graph and perform factor graph optimization to generate an updated/recalculated location estimation 332 for each vehicle 10 of the plurality of vehicles 10 in the cluster 20.

Figure 4A:
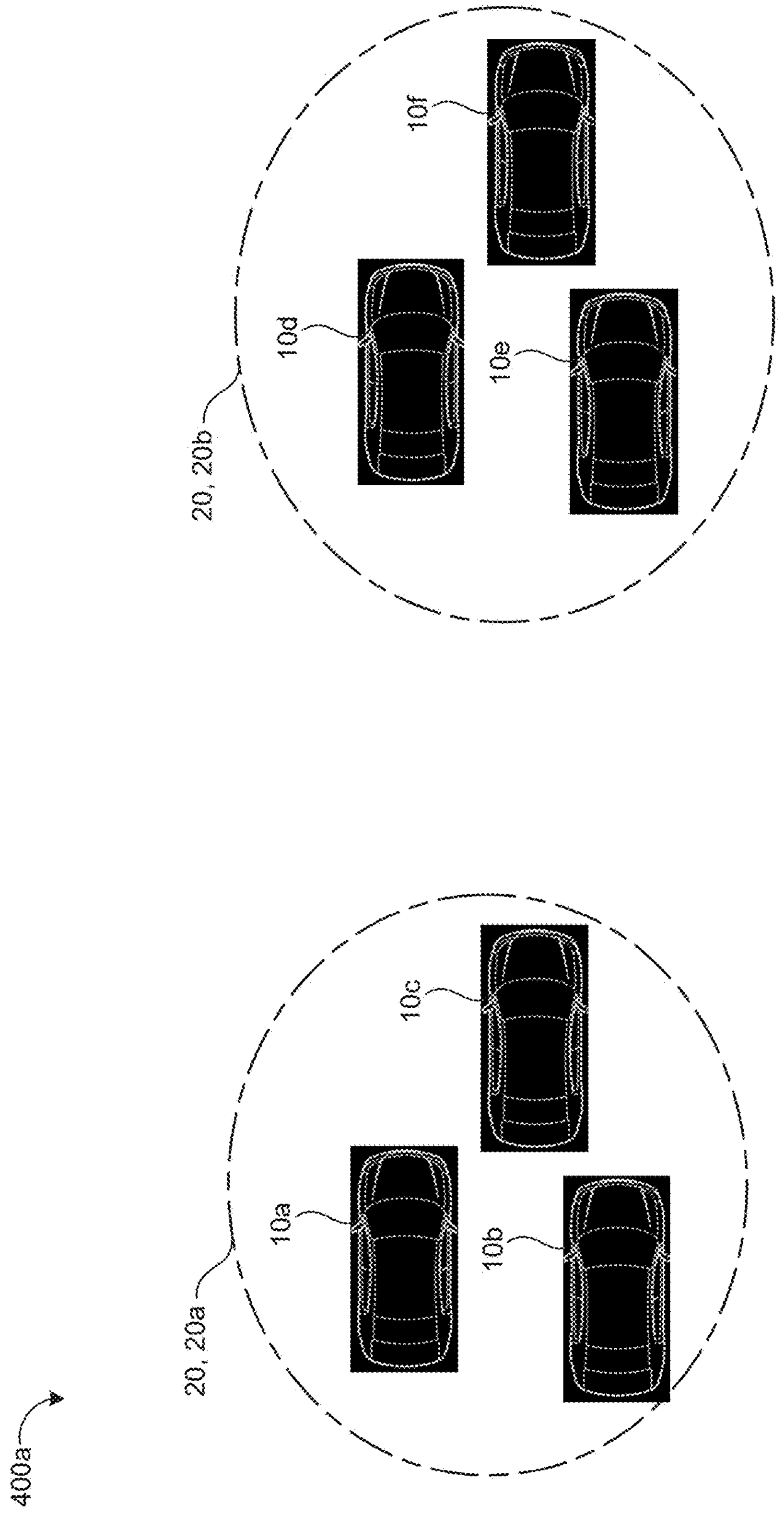
FIGS. 4A and 4B are schematic views of a vehicle moving between connected clusters of the system of FIG. 1.
Figure 4B:
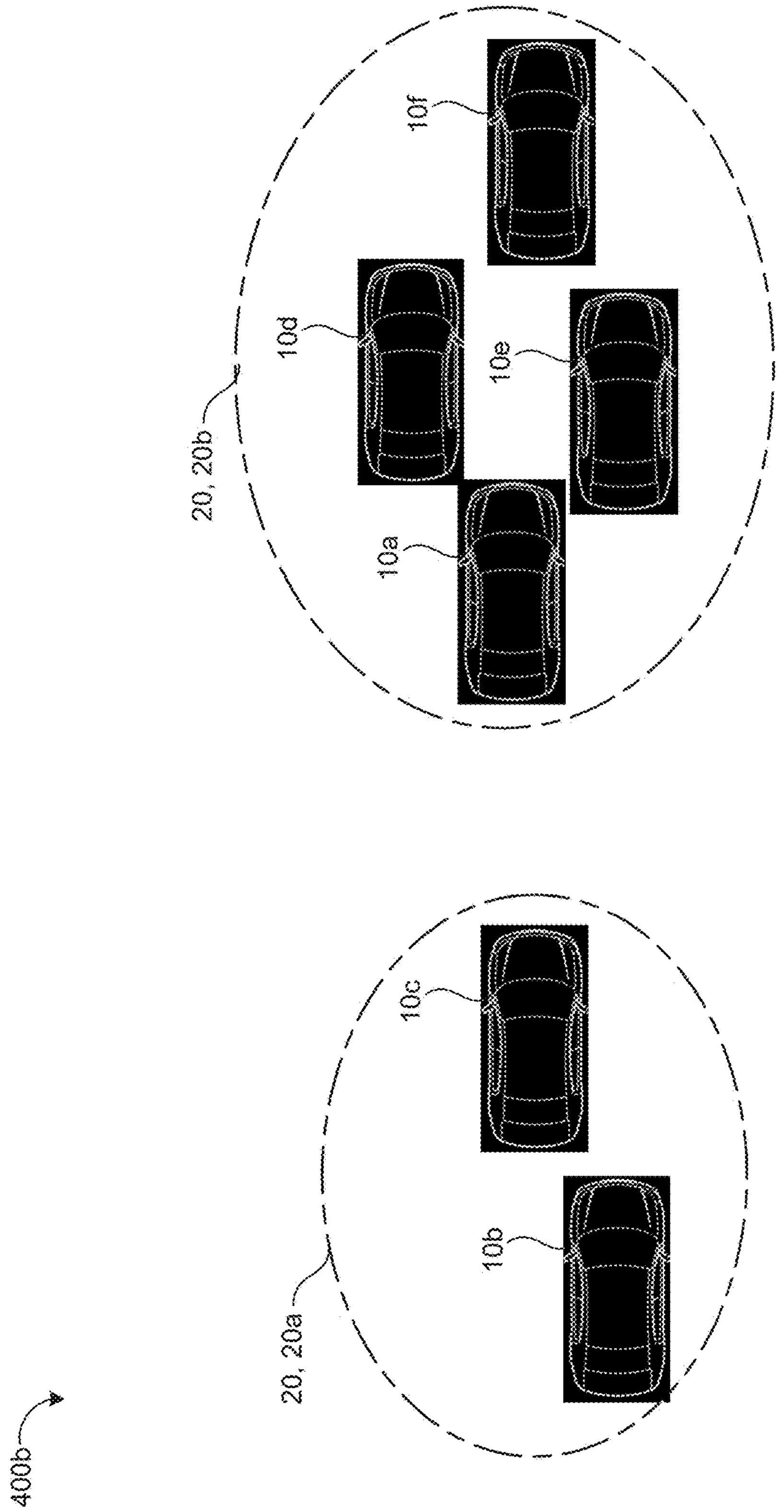
Figure 5:
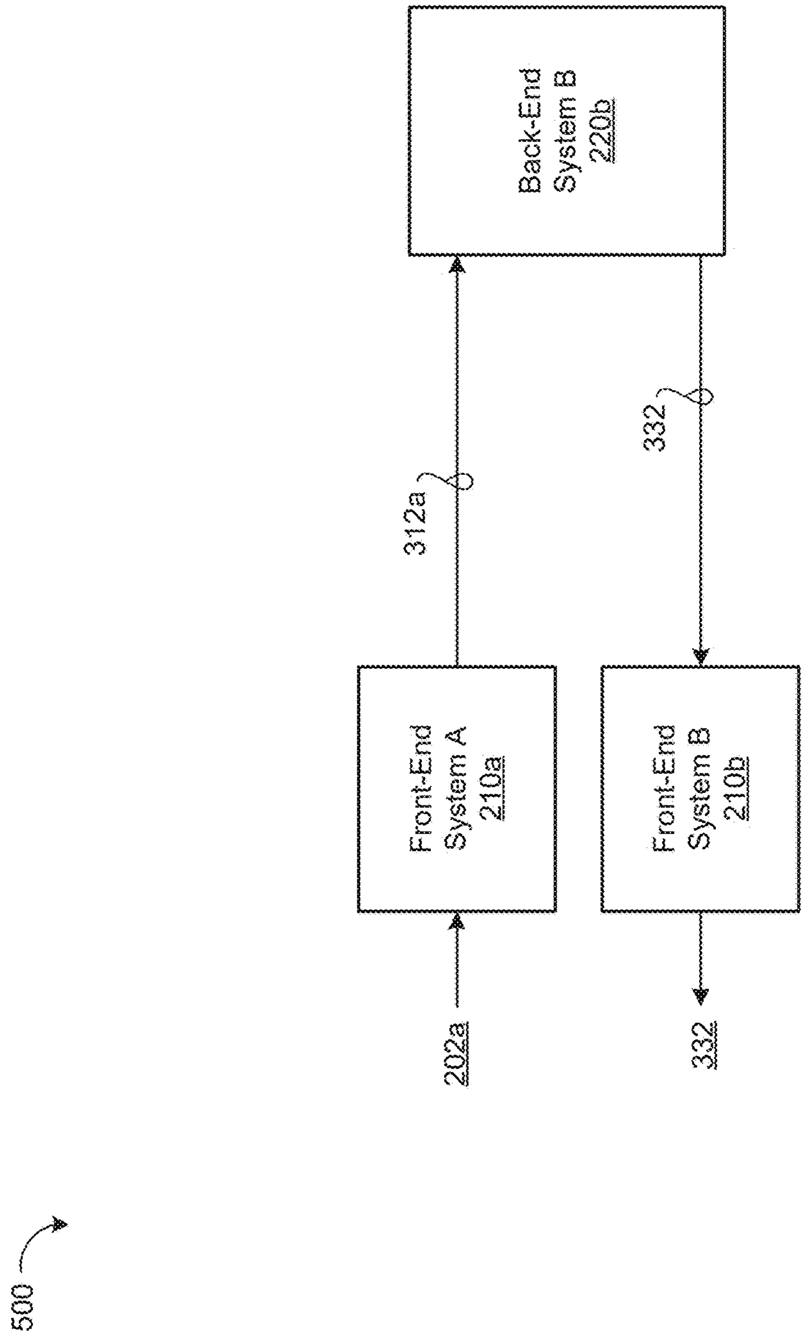
FIG. 5 is a schematic view of example components of FIG. 1.

Referring to FIGS. 4A, 4B, and 5, by virtue of the mobility of vehicles 10, the connected cluster system 200 dynamically adjusts and/or re-forms the composition of vehicles 10 within a particular cluster 20. For instance, as shown in FIGS. 4A and 4B, the environments 400*a*, 400*b* may include a first cluster 20*a* and a second cluster 20*b*. Further, as shown in FIG. 5, each cluster 20*a*, 20*b* may have a corresponding front-end system 210*a*, 210*b* and a corresponding back-end system 220*a*, 220*b* (220*a* not shown). In environment 400*a* (i.e., FIG. 4A), the connected cluster system 200 identifies the first cluster 20*a* including three (3) vehicles, 10 vehicle 10*a*, vehicle 10*b*, and vehicle 10*c*, and the second cluster 20*b* including three (3) vehicles 10, vehicle 10*d*, vehicle 10*e*, and vehicle 10*f*. However, as shown in FIG. 4B, the environment 400*b* has changed such that the vehicle 10*a* is now in closer proximity to the vehicles 10*d*-10*f*. Here, the connected cluster system 200 may update the first cluster 20*a* to remove the vehicle 10*a* such that only two (2) vehicles 10*b*, 10*c* remain. Additionally, the connected cluster system 200 updates the second cluster 20*b* to include the vehicle 10*a* that is now in close proximity to the three (3) vehicles 10*d*-10*f* such that the second cluster 20*b* now includes four (4) vehicles 10*a*, 10*d*-10*f*.

As shown in FIG. 5, after the connected cluster system 200 identifies the updated first cluster 20*a* and updated second cluster 20*b*, the connected cluster system 200 extracts the sensor data 202*a* and embedded states 312*a* corresponding to the vehicle 10*a* that migrated from the first cluster 20*a* to the second cluster 20*b* from the front-end system A 210*a* to the back-end system B 220*b*. Here, the back-end system B 220*b* may execute graph reconstruction (i.e., via its respective masking latency model 300*b*) to include the vehicle 10*a* in the factor graph and resulting location estimation 332 for the vehicles 10 in the second cluster 20*b*. Thereafter, the back-end system B 220*b* may provide, as input to the front-end system B 210*b*, the resulting location estimation 332 and factor graph including the additional vehicle 10*a* that joined the cluster 20*a*, where the front-end system B 210*b* further updates the location estimation 332 for each vehicle 10*a*, 10*d*-10*f* in the cluster 20*b*.

Figure 6:
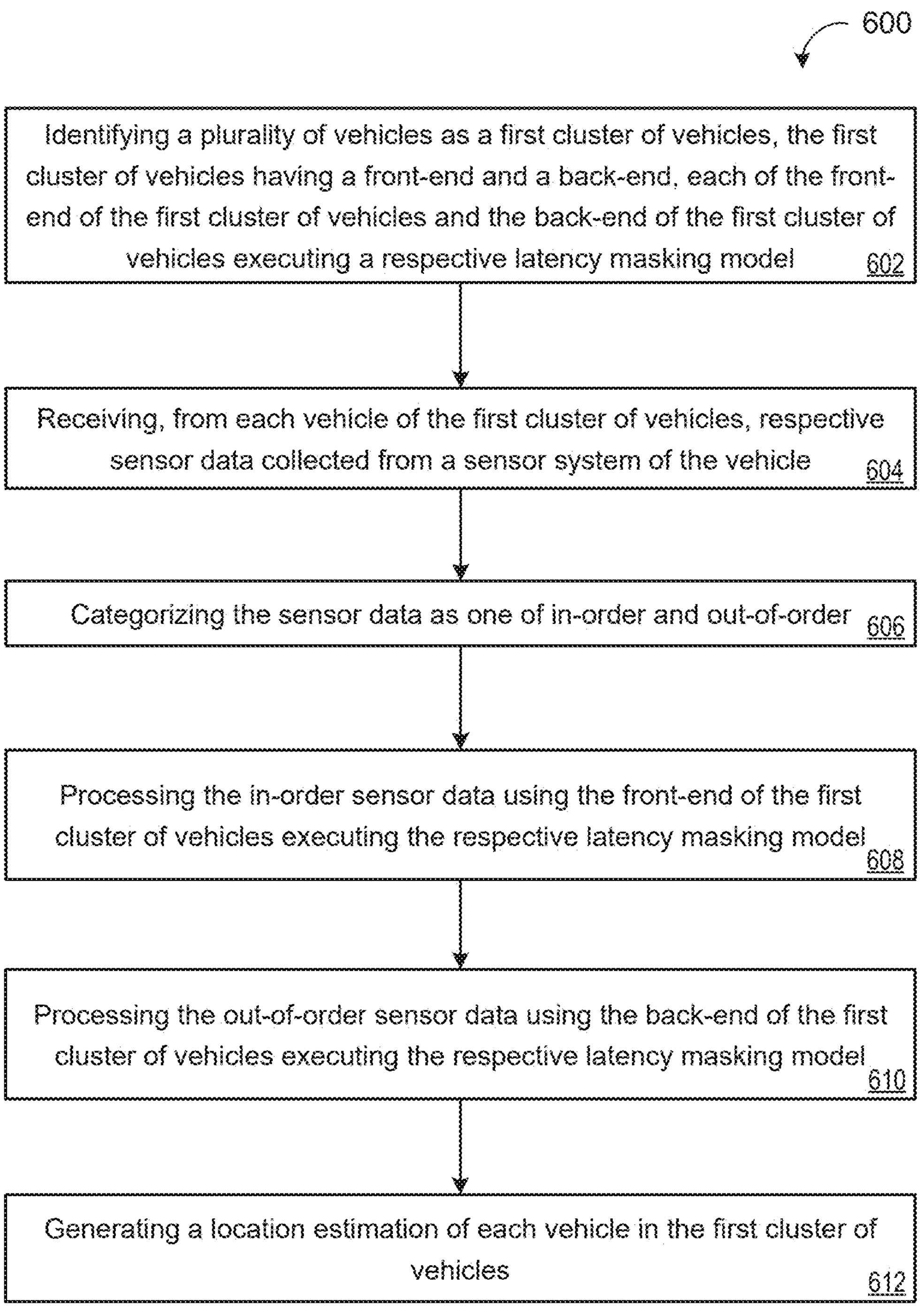
FIG. 6 is a flowchart of an example arrangement of operations for a method of cloud-based scalable positioning systems.

FIG. 6 includes a flowchart of an example arrangement of operations for a method 600 for cloud-based scalable positioning systems. The method 600 may be described with reference to FIGS. 1-5. Data processing hardware (e.g., data processing hardware 12*a*-12*c*, 62 of FIG. 1) may execute instructions stored on memory hardware (e.g., memory hardware 14*a*-14*c*, 64 of FIG. 1) to perform the example arrangement of operations for the method 600.

At operation 602, the method 600 includes identifying a plurality of vehicles 10, 10*a-c* as a first cluster 20 of vehicles 10. The first cluster 20 of vehicles 10 includes a front-end system 210 and a back-end system 220, each of the front-end system 210 of the first cluster 20 of vehicles 10 and the back-end system 220 of the first cluster 20 of vehicles 10 executing a respective latency masking model 300*a*, 300*b*. At operation 604, the method 600 includes receiving, from each vehicle 10 of the first cluster 20 of vehicles 10, respective sensor data 202 collected by a sensor system 16 of the vehicle 10.

The method 600 also includes, at operation 606, categorizing the sensor data 202 as one of in-order sensor data 202I and out-of-order sensor data 202O. At operation 608, the method 600 includes processing the in-order sensor data 202I using the front-end system 210 of the first cluster 20 of vehicles 10 executing the respective latency masking model 300*a*. At operation 610, the method 600 also includes processing the out-of-order sensor data 202O using the back-end system 220 of the first cluster 20 of vehicles 10 executing the respective latency model 300*b*. The method 600 also includes, at operation 612, generating a location estimation 332 for each vehicle 10 in the first cluster 20 of vehicles 10.

Figure 7:
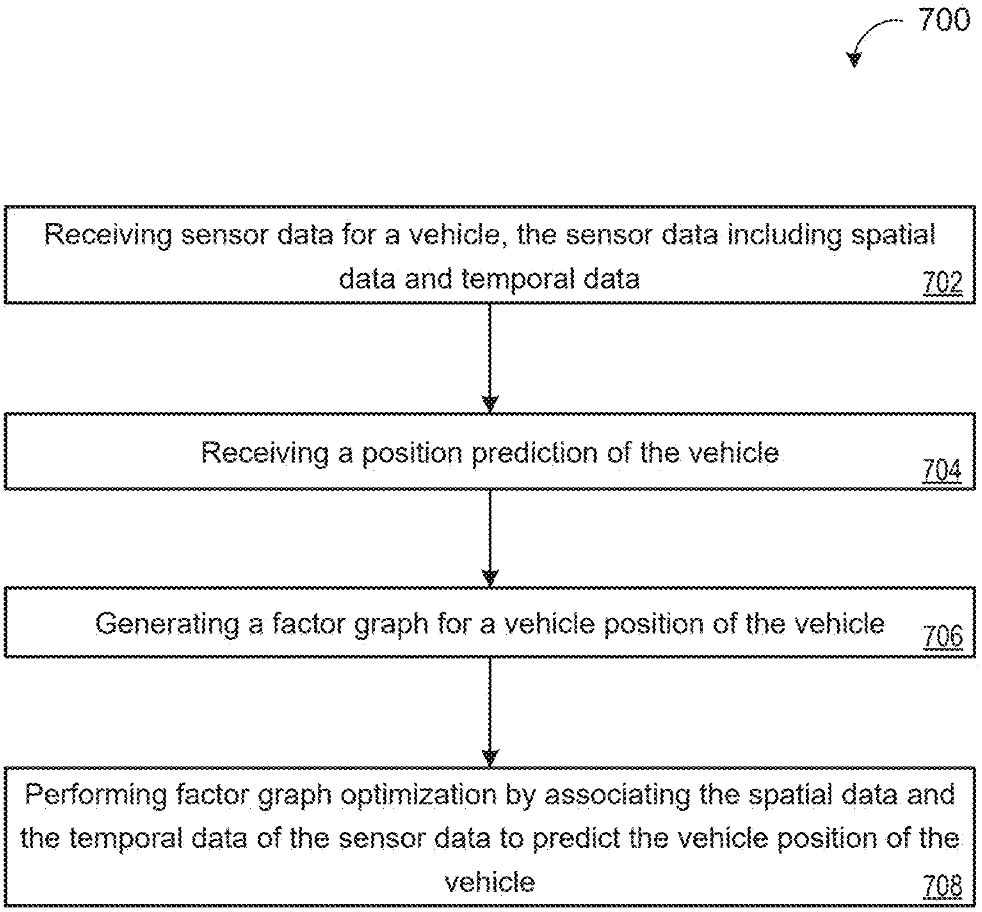
FIG. 7 is a flowchart of an example arrangement of operations for a method of latency masking.

FIG. 7 includes a flowchart of an example arrangement of operations for a method 700 for latency masking. The method 700 may be described with reference to FIGS. 1-5. Data processing hardware (e.g., data processing hardware 12*a*-12*c*, 62 of FIG. 1) may execute instructions stored on memory hardware (e.g., memory hardware 14*a*-14*c*, 64 of FIG. 1) to perform the example arrangement of operations for the method 700.

At operation 702, the method 700 includes receiving sensor data 202 for a vehicle 10. Here, the sensor data 202 includes spatial data 204 and temporal data 206. At operation 704, the method 700 also includes receiving a position prediction 222 of the vehicle 10. The method 700 further includes, at operation 706, generating a factor graph for a location estimation 332 of the vehicle 10. At operation 708, the method 700 also includes performing factor graph optimization by associating the spatial data 204 and the temporal data 206 of the sensor data 202 to predict the location estimation 332 of the vehicle 10.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed on data processing hardware causes the data processing hardware to perform operations comprising:

identifying a plurality of vehicles as a first cluster of vehicles, the first cluster of vehicles having a front-end and a back-end, each of the front-end of the first cluster of vehicles and the back-end of the first cluster of vehicles executing a respective latency masking model;

receiving, from each vehicle of the first cluster of vehicles, respective sensor data collected by a sensor system of the vehicle;

categorizing the sensor data as one of in-order and out-of-order;

processing the in-order sensor data using the front-end of the first cluster of vehicles executing the respective latency masking model;

processing the out-of-order sensor data using the back-end of the first cluster of vehicles executing the respective latency masking model;

generating a location estimation for each vehicle in the first cluster of vehicles; and updating, by the front-end of the first cluster of vehicles, a current factor graph based on the location estimation generated by the back-end of the first cluster of vehicles executing the respective latency masking model to generate an updated location estimation for each vehicle in the first cluster of vehicles.

2. The method of claim 1, wherein categorizing the sensor data as one of in-order and out-of-order comprises adding the out-of-order sensor data to a batch of out-of-order sensor data.

3. The method of claim 2, wherein processing the out-of-order sensor data comprises processing the batch of out-of-order sensor data at a predetermined time threshold.

4. The method of claim 1, wherein each of the latency masking models is configured to receive, as input, the sensor data and generate, as output, the location estimation of each vehicle of the first cluster of vehicles.

5. The method of claim 4, wherein each of the latency masking models executes a respective position prediction model.

6. The method of claim 5, wherein the sensor data for each vehicle of the first cluster of vehicles comprises one or more of:

original sensor data detected by a sensor system of the respective vehicle;

proximate sensor data detected by other vehicles in the first cluster of vehicles; and base sensor data detected by a base station in communication with the first cluster of vehicles.

7. The method of claim 1, wherein the operations further comprise receiving a position prediction of each vehicle of the first cluster of vehicles.

8. The method of claim 7, wherein the operations further comprise:

identifying one or more of the sensor data as missing based on corresponding temporal data of the sensor data; and inserting the received position prediction of the vehicle into a factor graph of the first cluster of vehicles based on the corresponding temporal data of the identified missing sensor data.

9. The method of claim 1, wherein the operations further comprise:

identifying that a first vehicle of the first cluster of vehicles has joined a second cluster of vehicles; and extracting the sensor data associated with the first vehicle from the front-end of the first cluster of vehicles.

10. The method of claim 9, wherein the operations further comprise reconstructing, using the extracted sensor data associated with the first vehicle from the front-end of the first cluster of vehicles, a factor graph of the second cluster of vehicles to include the first vehicle.

11. A system comprising:

data processing hardware; and memory hardware in communication with the data processing hardware, the memory hardware storing instructions that when executed on the data processing hardware cause the data processing hardware to perform operations comprising:

identifying a plurality of vehicles as a first cluster of vehicles, the first cluster of vehicles having a front-end and a back-end, each of the front-end of the first cluster of vehicles and the back-end of the first cluster of vehicles executing a respective latency masking model;

receiving, from each vehicle of the first cluster of vehicles, respective sensor data collected by a sensor system of the vehicle;

categorizing the sensor data as one of in-order and out-of-order;

processing the in-order sensor data using the front-end of the first cluster of vehicles executing the respective latency masking model;

processing the out-of-order sensor data using the back-end of the first cluster of vehicles executing the respective latency masking model;

generating a location estimation for each vehicle in the first cluster of vehicles; and updating, by the front-end of the first cluster of vehicles, a current factor graph based on the location estimation generated by the back-end of the first cluster of vehicles executing the respective latency masking model to generate an updated location estimation for each vehicle in the first cluster of vehicles.

12. The system of claim 11, wherein categorizing the sensor data as one of in-order and out-of-order comprises adding the out-of-order sensor data to a batch of out-of-order sensor data.

13. The system of claim 12, wherein processing the out-of-order sensor data comprises processing the batch of out-of-order sensor data at a predetermined time threshold.

14. The system of claim 11, wherein each of the latency masking models is configured to receive, as input, the sensor data and generate, as output, the location estimation of each vehicle of the first cluster of vehicles.

15. The system of claim 14, wherein each of the latency masking models executes a respective position prediction model.

16. The system of claim 11, wherein the operations further comprise:

identifying that a first vehicle of the first cluster of vehicles has joined a second cluster of vehicles; and extracting the sensor data associated with the first vehicle from the front-end of the first cluster of vehicles.

17. The system of claim 16, wherein the operations further comprise reconstructing, using the extracted sensor data associated with the first vehicle from the front-end of the first cluster of vehicles, a factor graph of the second cluster of vehicles to include the first vehicle.

18. A computer-implemented method when executed on data processing hardware causes the data processing hardware to perform operations comprising:

receiving sensor data for a vehicle, the sensor data including spatial data and temporal data;

receiving a position prediction of the vehicle;

generating a factor graph for a vehicle position of the vehicle;

performing factor graph optimization by associating the spatial data and the temporal data of the sensor data to predict the vehicle position of the vehicle;

identifying a missing portion of the sensor data based on the corresponding temporal data of the sensor data;

inserting the received position prediction of the vehicle into the factor graph based on the corresponding temporal data of the missing portion of the sensor data; and upon arrival of the missing sensor data, updating the factor graph based on the arrived sensor data.

19. The method of claim 18, wherein the sensor data for the vehicle comprises one or more of:

original sensor data detected by a sensor system of the vehicle;

proximate sensor data detected by other vehicles proximate to the vehicle; and base sensor data detected by a base station in communication with the vehicle.

20. The method of claim 18, wherein generating the factor graph for the vehicle position of the vehicle comprises:

identifying one or more of the sensor data as missing based on the corresponding temporal data of the sensor data; and inserting the received position prediction of the vehicle into the factor graph based on the corresponding temporal data of the missing sensor data.

* * * * *